United States Patent
Chen et al.

(10) Patent No.: US 8,971,451 B2
(45) Date of Patent: Mar. 3, 2015

(54) EFFICIENT BASEBAND SIGNAL PROCESSING SYSTEM AND METHOD

(71) Applicant: Futurewei Technologies, Inc., Plano, TX (US)

(72) Inventors: Weizhong Chen, Austin, TX (US); Yuanbin Guo, Allen, TX (US); Tong Sun, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 43 days.

(21) Appl. No.: 13/711,325

(22) Filed: Dec. 11, 2012

(65) Prior Publication Data

US 2014/0161210 A1 Jun. 12, 2014

(51) Int. Cl.
*H04L 27/00* (2006.01)

(52) U.S. Cl.
CPC ........................................ *H04L 27/00* (2013.01)
USPC .......................................................... 375/316

(58) Field of Classification Search
USPC .................. 375/316; 708/201, 495, 497, 512
See application file for complete search history.

(56) References Cited

U.S. PATENT DOCUMENTS

| 2012/0078988 A1 | 3/2012 | Miller | |
|---|---|---|---|
| 2012/0124115 A1* | 5/2012 | Ollmann | 708/204 |
| 2013/0054665 A1* | 2/2013 | Felch | 708/517 |
| 2013/0282777 A1* | 10/2013 | Guo et al. | 708/201 |

FOREIGN PATENT DOCUMENTS

| CN | 102255831 A | 11/2011 |
|---|---|---|
| CN | 102662160 A | 9/2012 |

OTHER PUBLICATIONS

Weizhong Chen, "A floating-point arithmetic based power/cycle efficient solution to wireless baseband processing", Dec. 15, 2011, 15 pages.

* cited by examiner

*Primary Examiner* — Khai Tran (57) ABSTRACT

According to one embodiment, an apparatus includes a digital signal processor configured to perform a multiple antenna detection portion of a baseband signal processing process using a first floating point processing unit, and perform all other portions of the baseband signal processing process using a half-precision floating point processing unit. The first floating point processing unit has a bit width that is larger than the bit width of the half-precision floating point processing unit.

28 Claims, 9 Drawing Sheets

EFFICIENT BASEBAND SIGNAL PROCESSING SYSTEM AND METHOD

TECHNICAL FIELD

The present invention relates generally to communication systems, and more particularly, to an efficient baseband signal processing system and method.

BACKGROUND

Industry wide practice of wireless baseband signal processing has been generally based on the belief that floating point arithmetic is less economical to build and less power efficient to operate than fixed point arithmetic, even though the fixed point algorithm design process is a tedious and time consuming task that typically requires a significant portion of research and development (R&D) time and investment, which is not needed for floating point calculations.

Wireless communication has now become part of everyone's routine life. Wireless radio links connect mobile phones to the cellular networks, which also connect to the internet, providing basic voice communications and a wide variety of other services such as short messaging, email, internet access and other business applications. The radio coverage of a typical mobile phone application varies from a few hundred meters in small cell applications to 10 kilometers in macrocell applications in rural areas. At home, people use wireless local area networks, referred to as "WiFi," that enables portable computing devices such as laptop and smart phones to connect seamlessly to the internet. The coverage of WiFi is up to a hundred meters. Bluetooth is another popular wireless technology with even smaller coverage up to 10 meters, initially intended for wired cable replacement. Bluetooth technology is now widely used in mobile phone for wireless connection between an earpiece and a mobile phone nearby.

These wireless communication systems at each side of the radio link, regardless of coverage sizes, have at least one transmitter antenna and at least one receiver antenna. Typical antenna configurations utilized include receiver diversity (two or more receiving antennas), transmitter beamforming (two or more transmitting antennas), and MIMO (Multiple Input and Multiple Output) (multiple transmitter and receiver antennas).

In mobile phone communications, one side of the communication link is a mobile station while the other side is a base station. In the GSM-based 3GPP family, both GMSK (2G) and EDGE (2.5G) use receiver antenna diversity, while WCDMA (3G) and LTE (4G) use beamforming and/or MIMO. GMSK/EDGE typically involves time division multiple access (TDMA) (physical layer link) technology, WCDMA uses code division multiple access (CDMA) technology, and LTE uses orthogonal frequency division multiple access (OFDMA) technology for the downlink and single channel-frequency division multiple access (SC-FDMA) technology for the uplink. These three different physical link technologies require three quite different baseband signal processing techniques.

SUMMARY

According to one embodiment, a method of digital baseband signal processing in a communication device is provided. The method includes performing a multiple antenna detection portion of a baseband signal processing process using a first floating point processing unit, and performing all other portions of the baseband signal processing process using a half-precision floating point processing unit. The first floating point processing unit has a bit width that is larger than the bit width of the half-precision floating point processing unit.

According to another embodiment, an apparatus includes a digital signal processor configured to perform a multiple antenna detection portion of a baseband signal processing process using a first floating point processing unit, and perform all other portions of the baseband signal processing process using a half-precision floating point processing unit. The first floating point processing unit has a bit width that is larger than the bit width of the half-precision floating point processing unit.

According to yet another embodiment, a communication device includes a digital signal processor configured to perform a multiple antenna detection portion of a baseband signal processing process using a first floating point processing unit, and perform all other portions of the baseband signal processing process using a half-precision floating point processing unit. The first floating point processing unit has a bit width that is larger than the bit width of the half-precision floating point processing unit.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device(s) or system(s).

Figure 1:
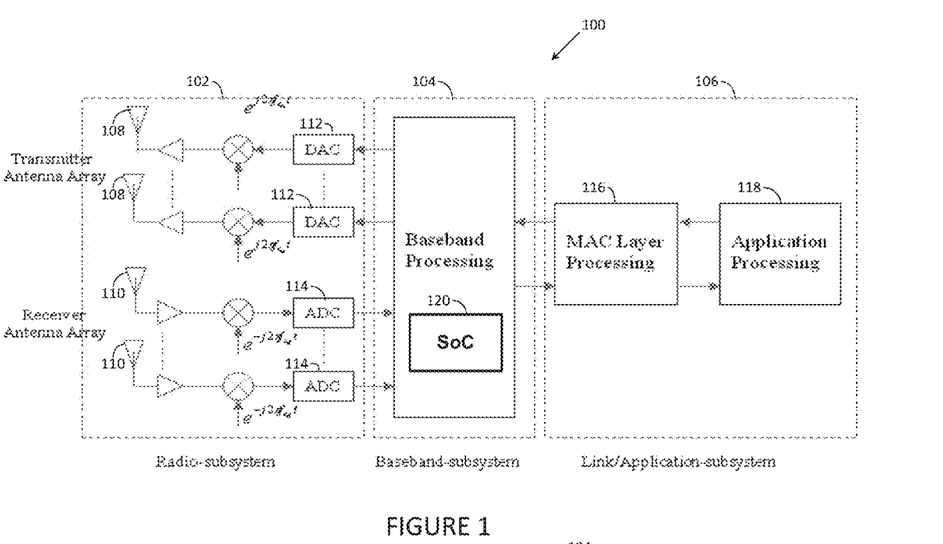
FIG. 1 illustrates an example communication system that may be implemented with an efficient baseband signal processing system according to this disclosure.

FIG. 1 illustrates an example communication system 100 that may be implemented with an efficient baseband signal processing system according to this disclosure. In the following description, reference is made to communication systems that conform to one or more communication specifications/standards. However, the baseband signal processing system may be implemented with any suitable type of communication system that transmits and receives data in a digital format.

The communication system 100 includes an RF sub-system 102 including a transceiver with a transmitter path and a receiver path. The RF sub-system 102 may also be referred to as a "RF front-end." The transmitter portion of the RF front-end 102 receives digital baseband signals generated by a baseband signal processing sub-system 104, upconverts the signals, and transmits them as RF signals (e.g., within an RF carrier) via one or more antennas 108. The receiver portion receives RF signals via the one or more antennas 110 and downconverts the RF signals into digital baseband signals for subsequent processing by the baseband signal processing sub-system 104.

Though digital-to-analog converters (DAC) 112 and analog-to-digital converters (ADC) 114 are shown physically or logically as part of the RF front-end 102, they may alternatively be considered part of the baseband signal processing subs-system 104 instead.

A Link/Application sub-system 106 includes a Media Access Control (MAC) processing system 116 responsible for assembling user information (data) streams into packets for RF transmission, and extracting information streams for each user from the received data stream. An application processing system 118 is related to user applications such as multimedia processing within the communication system 100.

The communication system 100 may be implemented as either a mobile/fixed user station or a base station. In the receiver path, the radio frequency sub-system (RF front-end) downconverts the radio frequency (RF) signal down from carrier frequency to baseband; and in the transmitter path, the RF sub-system shifts the baseband signal to the carrier frequency for RF transmission. The baseband sub-system is normally called the "physical layer" of the communication system. A Multiple Access Control (MAC) sub-system is responsible for assembling user information streams into packets for RF transmission, and extracting information streams for each user from the received data stream. The application processing is related to user applications such as multimedia processing.

According to certain embodiments of the present disclosure, baseband signal processing sub-system 104 includes a system on chip (SoC) 120 configured to perform a baseband signal processing process for received and/or transmitted signals. Details of the SoC 120 will be described in detail herein below.

Figure 2:
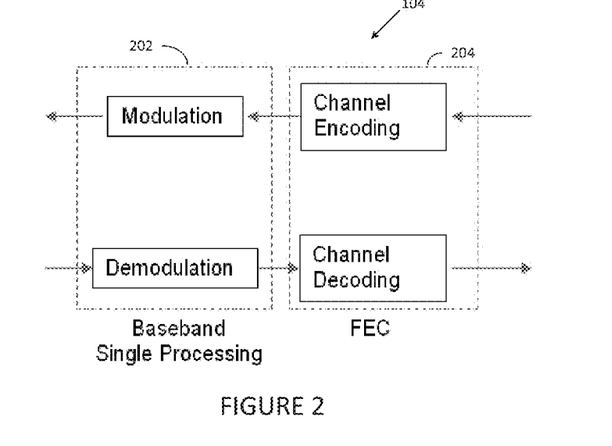
FIG. 2 illustrates an example of several components that comprises the baseband processing sub-system of FIG. 1 according to certain embodiments of the present disclosure.

FIG. 2 illustrates an example of several components that comprises the baseband processing sub-system 104 of FIG. 1 according to certain embodiments of the present disclosure. Specifically, the baseband processing sub-system 104 of FIG. 2 includes a baseband processing component 202 and a forward error correction (FEC) component 204. The FEC component 204 in the transmission path performs channel encoding that introduces redundant bits into the user information bit streams and channel decoding on the receiver path that uses the redundant bits to correct errors incurred by the mobile channel. The baseband signal processing component 202 in the transmission path functions to generate a baseband signal for RF transmission from the encoded bit streams. The baseband signal processing component 202 in the receiver path functions to recover the transmitted bit steams from the received baseband signal.

Conventional implementations of the baseband signal processing component 202 have used fixed-point calculations in software (SW) within a digital signal processing system, such as a digital signal processor (DSP) and/or in hardware application specific integrated circuits (ASIC), commonly called Hardware Accelerators (HAC). The reason behind this industry wide practice is the belief that floating point implementation of the baseband signal processing is more complex (less economical to design and manufacture) and less power efficient than fixed-point implementation.

Adders, multipliers, and the like, are logical elements that perform basic and extended digital numerical operations in digital processors, such as microprocessors, DSPs, HACs, and the like. Extended operations include square root, division, and the like, which can require substantial numerical processing, inherently increase their complexity. The overall performance of digital processors is generally dependent on the speed and energy efficiency of its constituent logical elements.

The design of adders, multipliers, and the like, is heavily dependent on the format representation of the numbers on which they operate. The cost of microprocessors, DSPs, and the like, is substantially proportional to the silicon area required to implement the logical elements from which they are formed. An important consideration in providing a competitive design for an end product is improvement in speed required for execution of numerical operations. The floating-point representation of numbers employed therein can have a substantial impact on the speed of numerical operations and the silicon area required for an implementation. According to certain embodiments, the SoC 120 may provide relatively more efficient processing with floating-point processing associated with the baseband signal processing component 202 relative to the conventional fixed point processing systems.

Figure 3A:
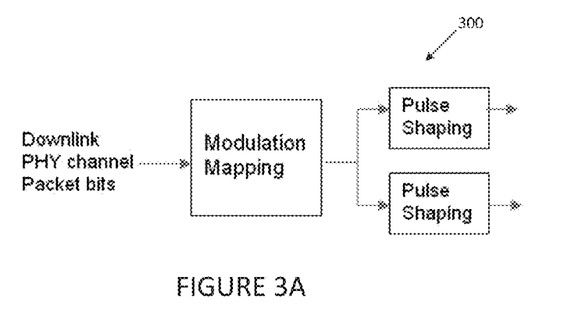
FIGS. 3A, 3B and 3C illustrate example baseband signal processing sub-systems that implement an Enhanced Data for GSM Evolution (EDGE), Code Division Multiple Access (WCDMA) and Long-Term Evolution (LTE) technologies, respectively, according to the embodiments of the present disclosure.
Figure 3B:
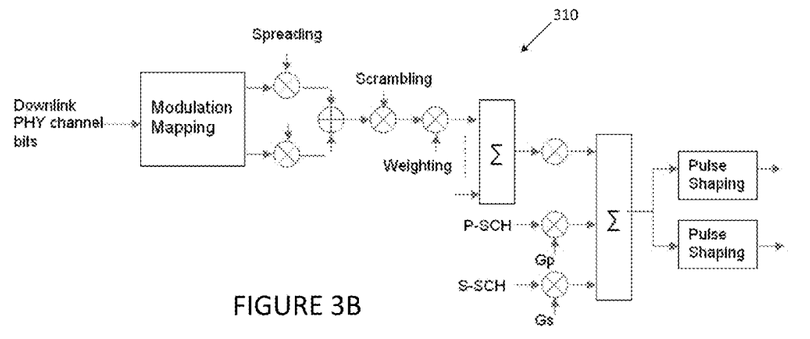
Figure 3C:
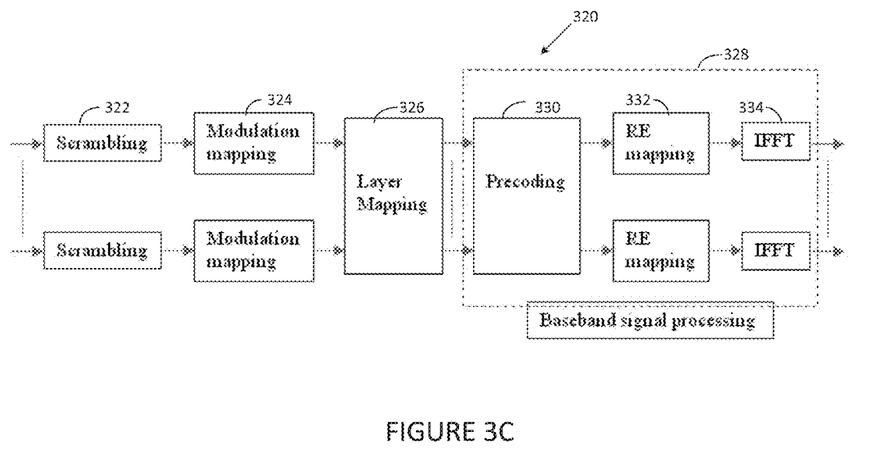

FIGS. 3A, 3B and 3C illustrate example baseband signal processing sub-systems 300, 310, and 320 that implement an Enhanced Data for GSM Evolution (EDGE), Code Division Multiple Access (WCDMA) and Long-Term Evolution (LTE) technologies, respectively, according to embodiments of the present disclosure. Implementation of these baseband signal processing sub-systems for transmission is relatively straightforward relative to their reception by following the 3GPP specifications/standards. However, the different portions of the chain may be implemented in using different SW/HW partitions for various tradeoff considerations. To comply with the radio spectrum specifications/standards and to increase the power amplifier efficiency for RF transmission, the baseband signal processing may also include pre-distortion processing in EDGE and LTE radio transmission.

With regard to FIG. 3C, one or more data streams are received and scrambled in one or more scrambling blocks 322, the data is modulated and mapped in one or more mapping blocks 324, and layer mapped using a layer mapping block 326. As will be appreciated, these processes are typically performed by the link/application sub-system 106. The scrambled and mapped data is received by the baseband signal processing system 328.

Within the baseband signal processing system 328, the received data is precoded using a precoding block 330, RE mapped using one or more RE mapping units 332, and transformed using one or more inverse Fast Fourier Transform (IFFT) blocks 334 to generate the digital baseband signal. The generated baseband signal is then forwarded to a RF front-end for RF transmission. It will be understood that the baseband signal processing that generates the baseband signal may be performed by the SoC 120 described above.

Figure 4A:
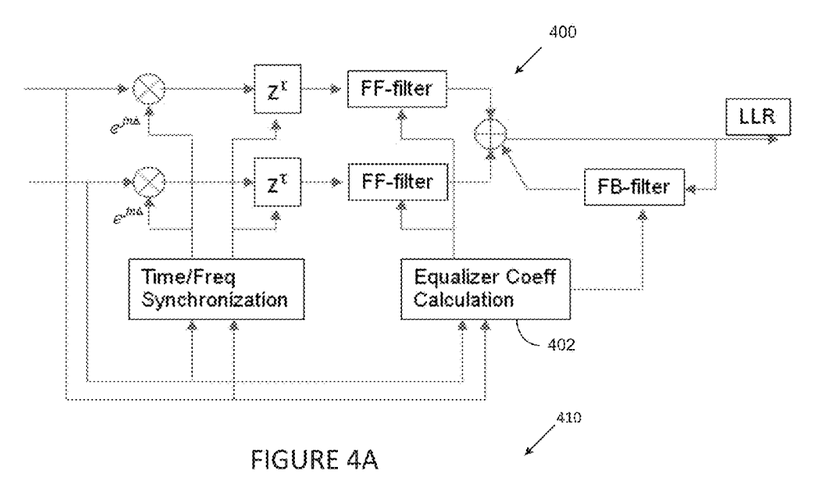
FIGS. 4A, 4B and 4C illustrate example baseband signal processing sub-systems within a receiver implementing EDGE, WCDMA, and LTE, respectively, according to the embodiments of the present disclosure.
Figure 4B:
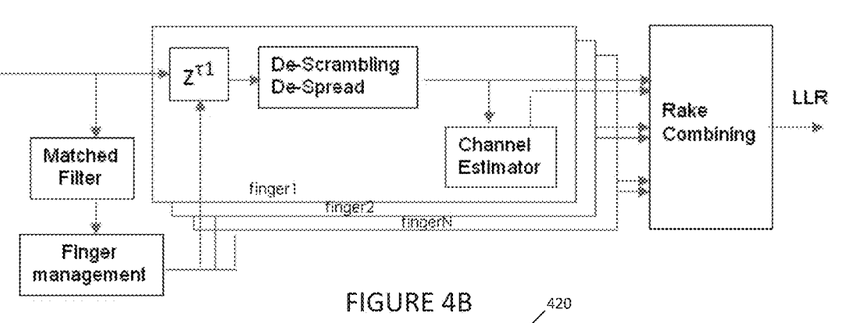
Figure 4C:
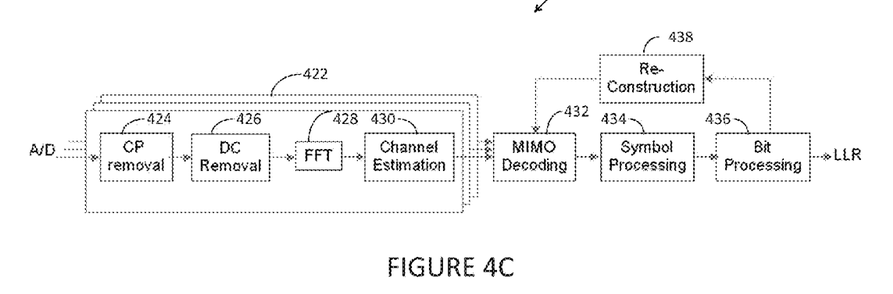

FIGS. 4A, 4B and 4C illustrate example baseband signal processing sub-systems 400, 410, and 420 within a receiver implementing EDGE, WCDMA, and LTE, respectively, according to embodiments of the present disclosure. Different from transmission, the baseband signal processing in the receiver is the centerpiece of wireless receiver products, including mobile/fixed user stations. Normally, a significant portion of the research and development (R&D) investment is in baseband receiver design and algorithms, which ultimately determine RF link performance of the overall RF system, complexity in SW and HW, and the cost of SW development and maintenance.

With regard to FIG. 4A, the baseband signal processing sub-system 400 implementing an EDGE decoding process includes a equalizer coefficient calculation block 402 that may function in a multiple antenna configuration or provide a voice services over adaptive multi-user channels on one slot (VAMOS) protocol that may require a precision greater than may be provided by a half-precision floating point processor. Thus in certain embodiments, a floating point processing unit having a precision greater than 16 bits may be used to perform this multiple antenna detection as described in detail below.

With particular regard to FIG. 4C, the baseband signal processing sub-system 422 receives one or more steams from a RF front end. Various processing is performed on the received signals, including cyclic prefix (CP) removal process using a CP removal block 424 and a DC components removal process using a DC removal block 426. A Fast Fourier Transform (FFT) process is then performed using a FFT block 428 and a channel estimation process is performed using a channel estimation block 430 to generate the recovered digital baseband signals.

The recovered digital baseband signal is further processed by the link/application sub-system 106, which may include a MIMO decoding block 432, symbol processing block 434, a bit processing block 436, and a reconstruction block 438 to recover the underlying transmitted digital data. In particular, the MIMO decoding process 432 may implement a multiple antenna detection process that may require a precision greater than may be provided by a half-precision floating point processor. Thus in certain embodiments, a floating point processing unit having a precision greater than 16 bits may be used to perform this multiple antenna detection as described in detail below.

In most cases, a fixed-point number representation has been used for the baseband modem chip design used in wireless cellular networks, such as EDGE, WCDMA, LTE, Universal Mobile Telephone System ("UMTS"), Global System for Mobile Communications ("GSM") and other wireless and wired communication systems. This is true for both HACs circuits in which the baseband algorithms are implemented in hardware silicon circuits with little flexibility, and for DSPs which include and allow software programmability. Most current commercial DSP cores dedicated for baseband signal use fixed-point arithmetic to achieve a necessary level of performance such as radio link performance. Conventional floating-point number formats are generally too complex for efficient baseband signal processing and thus would introduce more gates and power consumption.

Even in conventional systems that support multi-mode operations, these systems also typically partition the baseband signal processing into either a HW implementation using HACs or a SW implementation in DSPs. Regardless of HW implementation or SW implementation, the industry wide practice has been for the baseband signal processing algorithms to be implemented using fixed-point calculation. This has been due to a widespread belief that floating point is more complex to implement (e.g., more expensive to build and less power efficient to operate) with the floating point being assumed to include 32-bit single precision floating point. This belief has led to development and use of either fixed-point DSP processors or fixed point HACs within a system-on-chip (SoC) for wireless baseband processing. Because of this, virtually all baseband signal processing algorithms are designed for fixed-point processing. Fixed point-based single processing algorithm design is a special technique and requires time consuming and tedious efforts in the product R&D process. The following generally describes the design flow for developing a fixed point baseband signal processing algorithm.

For a baseband signal processing algorithm implemented in DSPs (e.g., with software), the fixed point DSPs in the market are typically designed with 16-bit calculation units. When more precision is needed, two or more 16-bit calculation units are combined into a higher precision calculation unit. To accommodate signal variations, the variables need to be checked dynamically for their leading most significant bit (MSB) locations in the 16-bit register and necessary shift of the variable's bits in their registers is made to ensure they make best use of the 16-bit registers. To reduce the cost of online checking, the MSB locations often are determined from algorithm analysis, thus not as optimal as the online check. With this algorithm predicted MSB location, saturation for overflow protection is used in the fixed point algorithm design. Because of the manual handling, it is difficult in practice to optimally use the 16-bit register and calculation in every step of the calculation. Thus, an approximate 0.5 to 1.0 dB loss in the fixed point design is normally present or inherent. To reduce this loss, shift/saturation operations of fine granularity are employed, but DSP efficiency is reduced. The shift/saturation operations not only add burden to the processing, but also break the calculation pipeline, thus significantly impacting the DSP power efficiency and DSP performance. Therefore, a tradeoff has to be made between radio performance compromise and DSP performance compromise.

For a baseband signal processing algorithm implemented in HACs, the allocation of the bit width for the variables at each step of calculation has to be carefully designed. Shift/saturation is also employed in the HW design for better use of the allocated bits and to protect overflow from happening. The main difference from the SW implementation in DSP is the utilization of finer granularity control of bit width allocation. However, this is still sub-optimal in power efficiency and has RF link performance compromise as well.

Because of the explosive demand for data rate increase and the expensive bandwidth to acquire, multiple antenna technology has been developed, such as MIMO techniques in WCDMA and LTE that increase the spectrum efficiency (e.g., more bits/Hz). MIMO, however, requires calculations that involve more dynamic range and precision. It has been felt that this additional need for dynamic range and precision makes utilization of fixed point DSPs significantly less efficient. To accommodate these new demands, extensions of the prior art fixed-point DSP cores for wireless baseband processing have been developed by several manufacturers that combine several fixed-point 16-bit calculation units into a single precision (i.e., 32-bit) floating point calculation unit. However, all of these systems are complex and costly, and do not take into consideration the different RF technologies currently in use.

As more and different radio link technologies are simultaneously operated in the field, there are needed various methods and systems/apparatus for baseband signal processing that reduce operation cost on the carrier side and reduce development cost on the vendor side. In addition, there is needed a baseband signal processing platform that can accommodate either 2G, 3G or 4G RF technologies with SW configuration, perhaps even accommodate these three generations concurrently.

Figure 5:
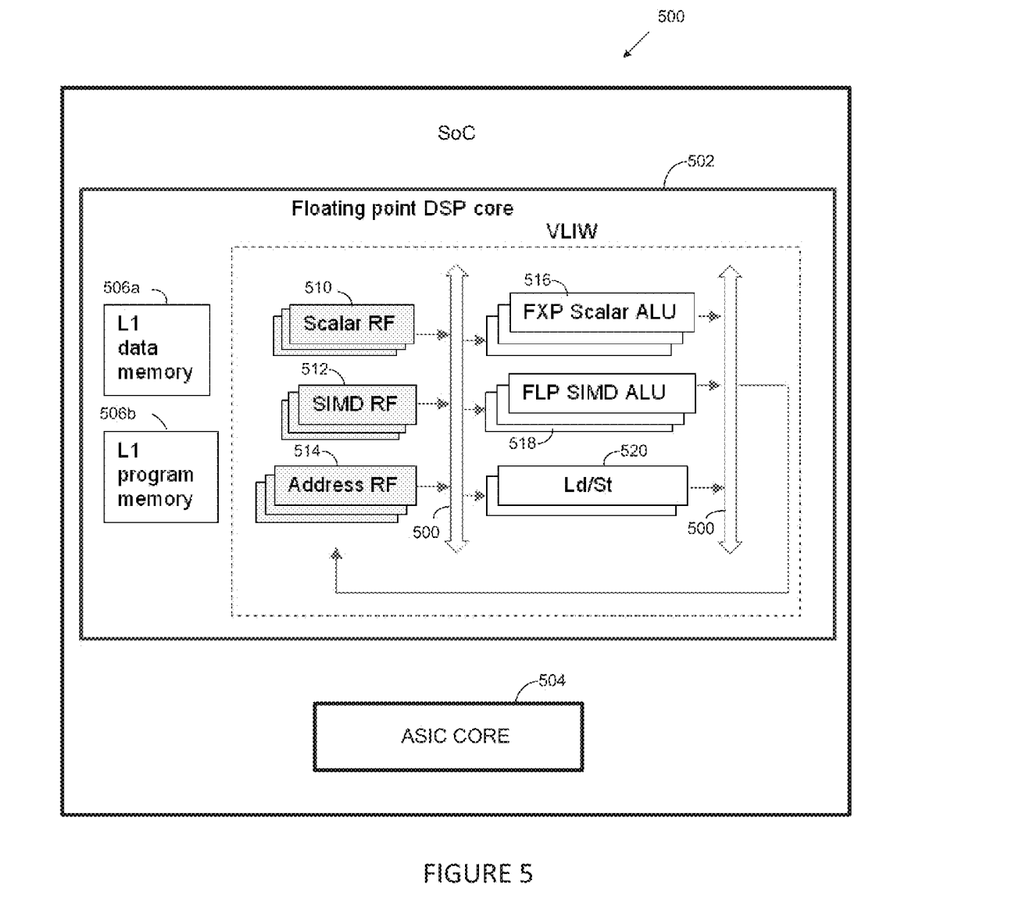
FIG. 5 illustrates an example system-on-chip (SoC) for performing baseband processing according to the embodiments of the present disclosure.

FIG. 5 illustrates an example system-on-chip (SoC) 500 for performing baseband processing according to the embodiments of the present disclosure. The embodiment of the SoC 500 shown in FIG. 5 is for illustration only. Other embodiments of a SoC 500 can be used without departing from the scope of this disclosure.

SoC 500 includes a DSP core 502 and an ASIC core 504. The DSP core 502 includes a layer 1 (L1) data memory 506a for storing data, and L1 program memory 506b for storing program instructions. Within the DSP core 502 there exists a very long instruction word (VLIW) processor unit 508 (shown by dotted lines) which includes one or more scalar registers 510, one or more single instruction multiple data (SIMD) registers 512, and one or more address registers 514. Also included are one or more fixed point (FXP) scalar arithmetic logic units (ALUs) 516, multiple floating point (FLP) SIMD ALUs 518 and one or more load/store (Ld/St) units 520. These units are communicatively coupled and interconnected via one or more busses 522 and 524. As will be appreciated, the FXP scalar ALU 516 generally performs integer parameter calculations and is generally not used for baseband signal data processing. On the other hand, the floating point ALUs 518 function together to perform the baseband signal data processing.

The floating point ALUs 516 generally comprise half-precision (e.g., 16 bit) floating point processing units that may function independently of one another, or may be combined to form floating point processing units having greater than 16 bit granularity. For example, two or more half-precision processing units may be combined to form a single-precision (e.g., 32 bit) floating point processing unit. In a particular embodiment of the present disclosure, two or more of the 16-bit floating point ALUs can be combined to generate a floating point ALU that can implement a 28-bit floating point ALU.

It has been discovered by the inventors that a 28-bit floating point ALU provides sufficient precision for performing key baseband processing steps, such as multiple antenna detection as implemented in WCDMA and LTE baseband processing, and equalizer coefficient calculation as implemented in EDGE baseband processing.

Thus, according to one embodiment, the DSP core 508 may perform multiple antenna detection processing and/or the equalizer coefficient calculation using two or more combined half-precision ALUs 518 forming a single 28-bit processing unit, and perform all other baseband processing using the half-precision ALUs 518 independently of one another. In other embodiments, two or more half-precision ALUs may be combined to form a single floating point ALU have any level of precision, such as one having less than 28-bit precision, or greater than 28-bit precision. Additionally, other embodiments may include separately configured half-precision floating ALUs and other floating point ALUs having a precision greater than the half-precision ALUs.

The present disclosure challenges the conventional wisdom and describes a set of floating point arithmetic based technologies that implement wireless baseband signal processing, while achieving significant power reduction and cycle efficiency, and a reduction in design time. This disclosure describes technologies that may be more economical to build and more power efficient to operate, with little or no compromise in RF link performance. As will be described in detail below, these new technologies include: (1) a wireless baseband signal processing design flow with floating point arithmetic DSP, (2) a floating point arithmetic based DSP architecture for wireless baseband signal processing, and (3) a design flow for baseband signal processing with floating point arithmetic.

The inventors have discovered that all base station baseband signal processing can be performed using 16-bit floating point calculations and provide an acceptable level of operational characteristics, with the exception that multiple antenna detection related matrix element calculations and matrix inversions in the receiver baseband signal processing require a more precise floating point calculation (e.g., greater than 16-bit precision. Thus, a higher accuracy (e.g., greater than 16-bit precision) floating point calculation unit is proposed in those types of situations.

In general terms, the present disclosure teaches and describes a communications device having a DSP-based baseband signal processing system including a 16-bit (e.g., half-precision) floating point calculation unit (e.g., 16-bit ALU). In other words, baseband signal processing is performed using, at most, 16-bit floating point calculations. In an embodiment in which the communications device implements multiple antenna detection (e.g., MIMO), a receiver therein includes a DSP-based signal processing system with a 28-bit floating point calculation unit.

For additional information that may relate to the present disclosure, one may refer to U.S. patent application Ser. No. 13/452,701 entitled "System and Method for A Floating Point Format For Digital Signal Processors" and U.S. patent application Ser. No. 13/452,690 entitled "System and Method For Signal Processing in Digital Signal Processors", which are both incorporated herein by reference.

Although FIG. 5 illustrates an example SoC 500 that may be used to provide efficient baseband processing, various changes may be made to FIG. 5. For example, FIG. 5 merely shows example arrangement of a floating point DSP core 502 and a ASIC core 504. In other examples, the floating point DSP core 502 may be implemented in a separate monolithic chip from which the ASIC core 504 is implemented. Additionally, elements of the floating point DSP core 502 may be implemented separately from one another, such as the fixed point scalar ALU 516 relative to the floating point SIMD ALUs 518.

Figure 6A:
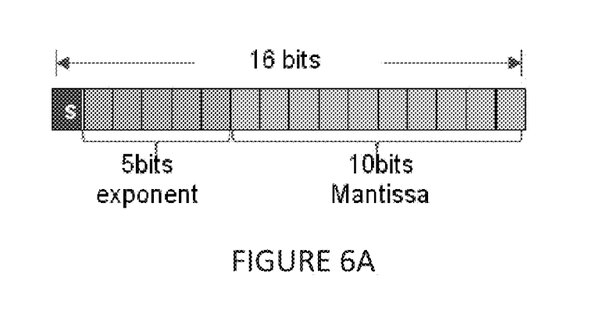
FIGS. 6A and 6B illustrate the 16-bit half precision floating point format and the 28-bit floating point format, respectively, that may be used by the embodiments of the present disclosure.
Figure 6B:
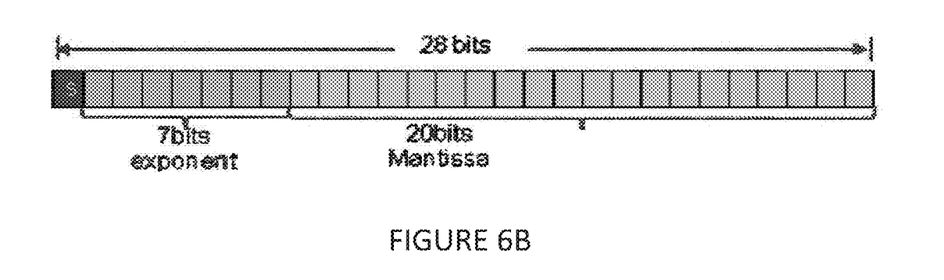

FIGS. 6A and 6B illustrate the 16-bit half precision floating point format and the 28-bit floating point format, respectively, that may be used by embodiments of the present disclosure. The variables represented by the 16-bit format can be given as follows:

$$x = s \times 2^{\left(\sum_{j=0}^{4} n_j 2^j - 16\right)} \times \left(1 + \sum_{k=1}^{10} m_k 2^{-k}\right)$$

where s is the sign bit, $n_j$ is the jth significant exponent bit, and $m_k$ is the kth significant bit. Similarly, the variables represented by the 28-bit format can be given as follows:

$$x = s \times 2^{\left(\sum_{j=0}^{6} n_j 2^j - 16\right)} \times \left(1 + \sum_{k=1}^{20} m_k 2^{-k}\right)$$

where s is the sign bit, $n_j$ is the jth significant exponent bit, and $m_k$ is the kth significant bit.

Referring back to the transmission and reception baseband signal processing flows in FIGS. 3A-3C and 4A-4C, the EDGE equalizer coefficient calculation block in FIG. 4A and the LTE MIMO detection block in FIG. 4C may require floating point calculations with a precision higher than 16 bits. Both of these blocks may be related to multiple antenna detection. When there is no receiver diversity, the EDGE equalizer coefficient calculation does not require higher precision, thus, 16-bit floating point calculations are sufficient. As will be appreciated, the minimum number of floating point bits for baseband signal processing involving multiple antenna detection via the receiver is dependent on the receiver front-end noise floor and the correlation coefficients of the fading channels experienced by the receiving antennas, which is related to the spatial separation. The lower the noise floor of the receiver front-end, the higher the precision is needed for the multiple antenna detection. The higher the correlation of the antennas (e.g., closer antennas), the higher the precision is needed for the multiple antenna detection.

Figure 7:
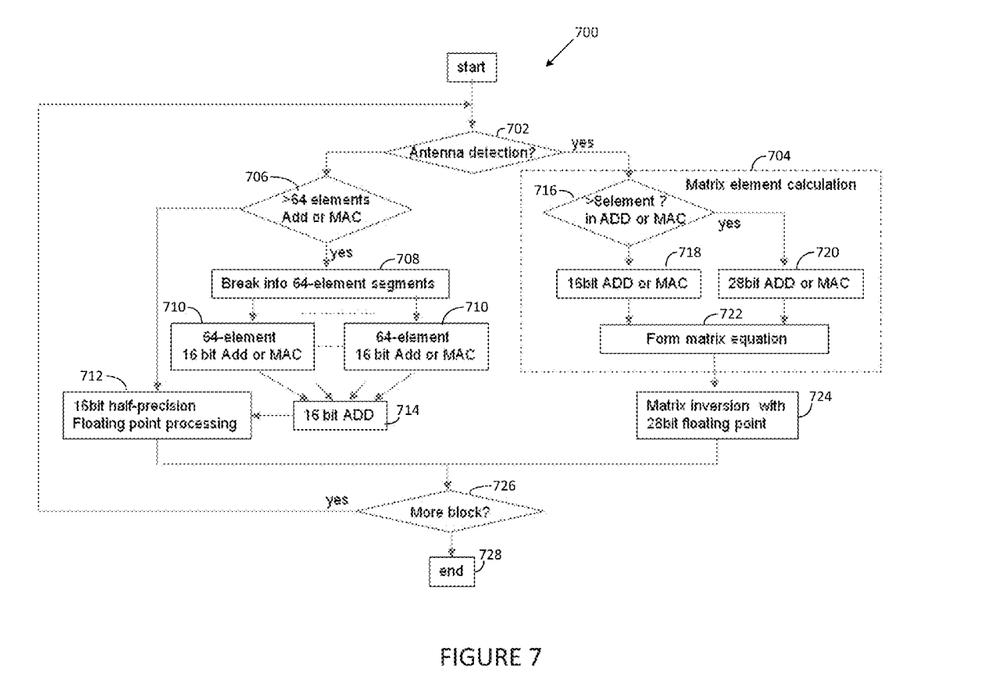
FIG. 7 illustrates an example process that may be used by the SoC of FIG. 5 to process one or more incoming baseband streams according to the embodiments of the present disclosure.

FIG. 7 illustrates an example process that may be used by the SoC 500 of FIG. 5 to process one or more incoming baseband streams according to embodiments of the present disclosure.

In step 702, the SoC 500 determines whether a multiple antenna detection process is to be performed. If so, processing continues in block 704 in which a matrix element calculation is performed. If not, processing continues at step 706 in which it is determined whether an accumulation function includes more than 64 elements. If so, the total quantity of elements are segregated into separate blocks of 64 elements in step 708, the accumulation function performed independently on each of these blocks in step 710, and subsequently added together using a half-precision ALU 712 to complete the accumulation operation in step 714.

Processing of the matrix element calculation block 704 will now be described. As mentioned previously, the matrix element calculation block 704 may be performed when a multiple antenna detection process is detected in step 702. In step 716, the SoC 500 determines whether the multiple antenna detection involves more than eight elements. If not, processing continues at step 718 in which the calculation is performed using a half-precision ALU. However, if the multiple antenna detection involves more than eight elements, a 28 bit ALU is used in step 720. From the interim calculation performed in steps 718 and 720, the matrix equation is calculated in step 722, and a matrix inversion calculation is performed in step 724.

In step 726, the SoC determined whether additional blocks are to be processed. If so, processing continues at step 722. However, if no further blocks are to be processed, processing continues at step 728 in which the process ends.

As shown, the process identifies whether a function needs 16-bit floating point arithmetic or higher accuracy (e.g., 28-bit) floating point arithmetic as described above with reference to step 702. In addition, certain additional steps are performed to ensure overflow protection and accuracy reduction protection in steps 706 through 714.

Because a floating point representation may have a large dynamic range, overflow protection may be needed at only a few points in a large communication system. Though difficult to implement in a fixed point system, overflow protection in a floating point system is relatively simple to implement because there is no need for online determination of scaling factors. Predetermined scaling factors are sufficient, and the scaling factors can be a power of 2 (e.g., $2^n$) in which n may be a positive or a negative integer. Thus the implementation may be as simple as adding or subtracting a specified constant in the exponents. One method of implementing this function would be implement a special instruction in the SoC 500 for this purpose.

Because the number of mantissa bits that actually participate in the calculation is smaller than that used in a fixed floating point ALU (resulting in significant power reduction), the floating point arithmetic unit in the SoC 500 may incur a reduction in accuracy. For example, in the case of the addition or subtraction of two variables, the two values will be aligned with the one with larger magnitude before the addition or subtraction. The LSB bits of the smaller one would then be shifted out of range, thus being lost in the accumulation. If the two variables have a large magnitude difference, the smaller variable could lose too many LSB bits and even could be lost entirely if the difference is too big.

To avoid the accuracy loss statistically, when accumulating over a big number of items, the accumulation can be broken into segments, and accumulation within each segment is performed first, then the segment accumulations are accumulated. This approach appears to be effective. The following example explains this operation. For example, assume the accumulation of 640 elements is:

$$A = \frac{1}{640} \sum_{k=1}^{640} x_k$$

In a conventional implementation, this is calculated iteratively with accumulation since it can use a pipeline within the SoC 500. The magnitude difference of the values of $A_{k-1}$ and $x_k$ grows as k increases. Adding $A_{k-1}$ and $x_k$ together when they have big differences in magnitude will cause accuracy loss for the resulting $A_k$.

$A_0 = 0$, initialization $A_k = A_{k-1} + x_k, k=1,2,\ldots,640$

To explain the nature of the problem and the solution, the SIMD operation is not considered here, since between the SIMD accumulation operations, the accuracy loss issue is identical to that without SIMD. To reduce the accuracy loss, the 640 data values are segmented into 10 groups, each with 64 data values. The accumulation is applied to each group, and the results of the 10 groups are then accumulated.

Although the embodiment described above includes an accumulation technique in which 640 data values are segmented into 10 groups, other embodiments of the accumulation technique may be performed with any quantity of data values that are segmented into any quantity of groups. For example, the accumulation technique may be performed with more than 640 data values or less than 640 data values, and these other quantity of data values may be segmented into more than 10 groups or less than 10 groups.

Figure 8:
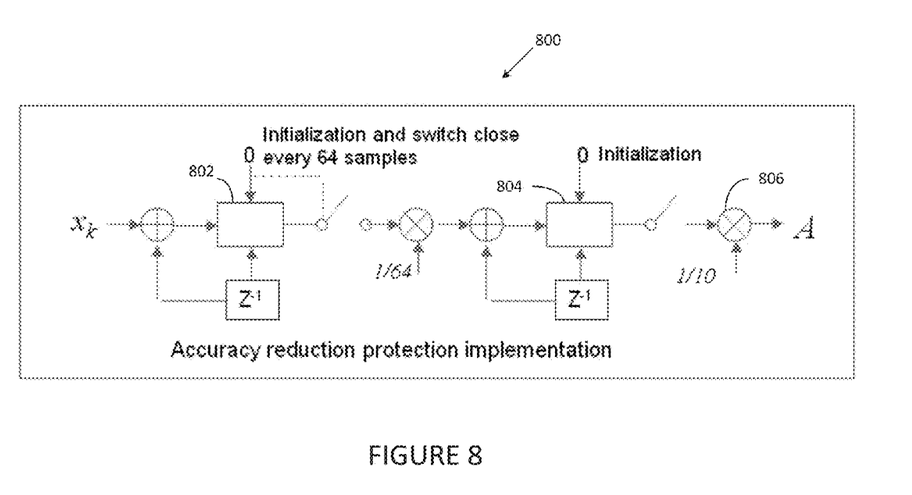
FIG. 8 illustrates an example accumulation architecture according to the embodiments of the present disclosure.

FIG. 8 illustrates an example accumulation architecture according to embodiments of the present disclosure. In FIG. 8, an accumulation architecture and process (e.g., accuracy reduction protection circuitry) are shown for floating point arithmetic. The accuracy reduction protection circuitry 800 includes a first stage 802 and a second stage 804. The first stage 802 is initialized with a switch closed every 64 samples. This generates 64-element accumulation segments. Thus, after 64 elements are accumulated, the switch closes and the accumulated value is forwarded to the second stage 804. The accuracy reduction protection circuitry also includes a 1/10 multiplier 806. Thus, the output of the accuracy reduction prevention circuitry 800 is an accumulation of multiple accumulated (e.g., 64 element) values. In other embodiments, multiple accumulated values may include less than or greater than 64 element values.

This concept is equally applicable for a multiplication and accumulation (MAC) example:

$$B = \frac{1}{640} \sum_{k=1}^{640} x_k y_k$$

The elements should also be partitioned into segments and implemented similarly to the accuracy reduction protection given in FIG. 8.

Figure 9:
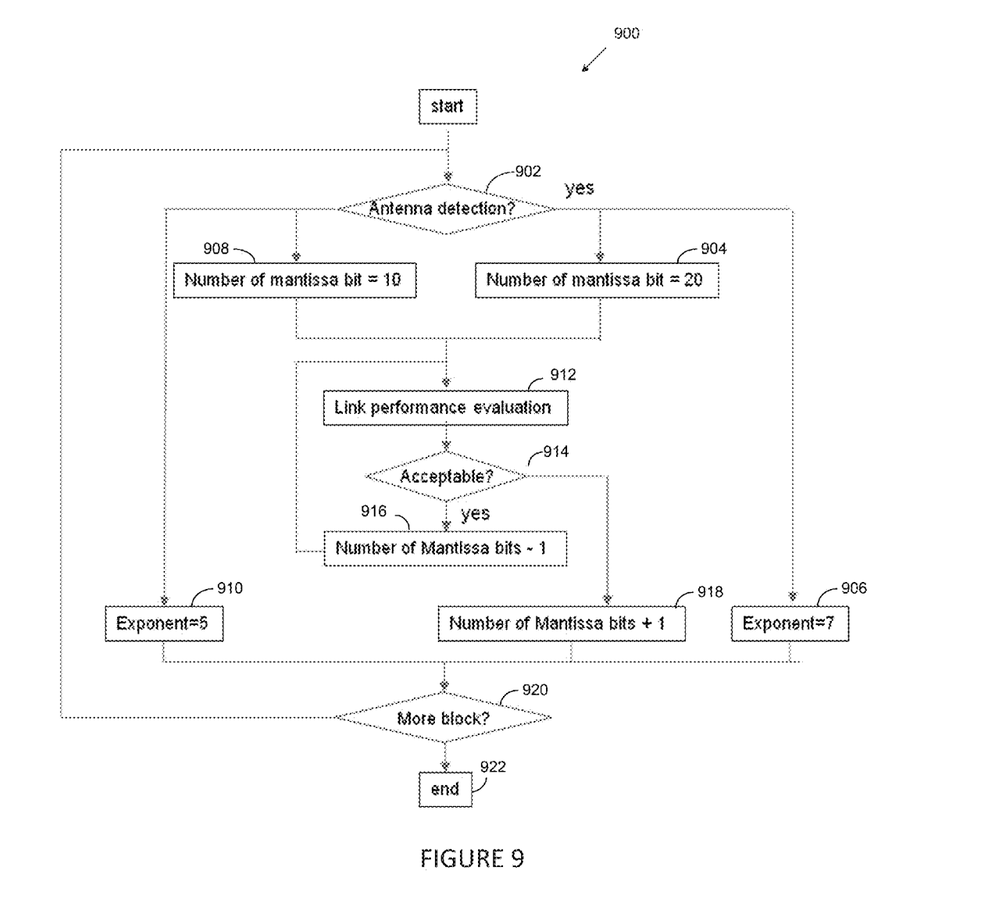
FIG. 9 illustrates an example process for implementing a variable precision floating point calculation according to the embodiments of the present disclosure.

FIG. 9 illustrates an example process for implementing a variable precision floating point calculation according to embodiments of the present disclosure.

In step 902, the SoC 500 determines whether multiple antenna detection process is to be performed. If so, processing continues at steps 904 and 906 in which a 28-bit ALU is initially set to have 7 exponent bits and 20 mantissa bits. If not, processing continues at steps 908 and 910 in which a half-precision ALU is initially set to have 5 exponent bits and 10 mantissa bits.

Next in step 912, a link performance evaluation is conducted on the received signal stream. The SoC 500 then determines from the conducted link performance evaluation whether the received signal stream has an acceptable quality level in step 914. If so, the number of mantissa bits is adjusted to reduce the quantity of mantissa bits in step 916. For example, if the previous number of mantissa bits set for a half-precision ALU has been initially set at 10, the number of mantissa bits may be reduced to only 9 bits. In the manner, only a required level of precision may be used thus reducing processing load on the system according to certain embodiments. However, if it is determined that the conducted link performance evaluation is not acceptable in step 914, the number of mantissa bits may be adjusted to include more bits in step 918.

In step 920, the SoC determined whether additional blocks are to be processed. If so, processing continues at step 902. However, if no further blocks are to be processed, processing continues at step 922 in which the process ends.

As described above, the SoC 500 implements a baseband signal processing algorithm function has flexibility to allocate variable bit width for each calculation unit than conventional DSP approaches. With hardware ASIC design, the bit width of each variable and each calculation unit can be optimized. The design flow provided in FIG. 9 described above is for a baseband signal processing function, such as MIMO detection. The MIMO detection function can be broken into a set of steps of calculation or blocks of sub-functions. FIG. 9 describes the design flow to determine the bit width of the floating point variables and arithmetic operations for these sub-functions. In some cases, this process may provide a minimum (e.g., optimal) number of mantissa bits needed to meet the required performance. The number of exponent bits can also be determined by following the same steps. However, since the exponent does not participate in the calculation, even if it is optimized, it does not contribute as meaningful circuit savings as compared with that of varying the number of mantissa bits as described above in FIG. 9.

Figure 10:
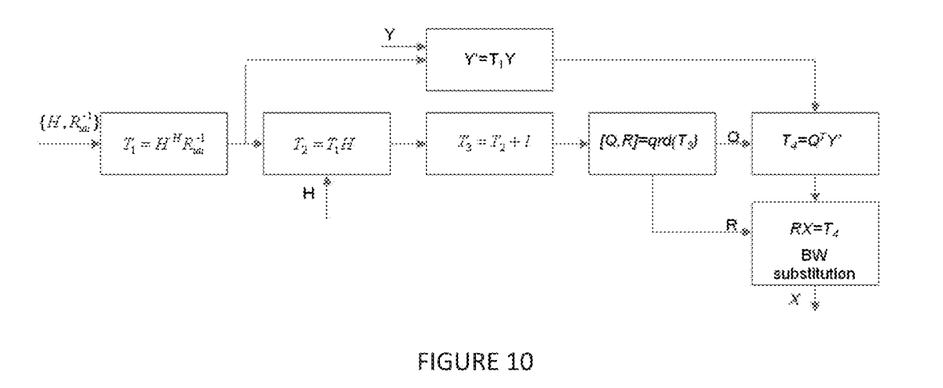
FIG. 10 illustrates an example process flow diagram 1000 for performing various calculation steps of a multiple antenna detection process according to the embodiments of the present disclosure.

FIG. 10 illustrates an example process flow diagram 1000 for performing various calculation steps of a multiple antenna detection process according to embodiments of the present disclosure. The embodiment of the process flow diagram 1000 shown in FIG. 10 is for illustration only. Other embodiments of process flow diagrams for a multiple antenna detection process can be used without departing from the scope of this disclosure.

In the LTE MIMO detection, the following matrix equation is to be resolved:

$$X = (H^H R_{uu}^{-1} H + I) H^H R_{uu}^{-1} Y$$

Where X is an $N_t \times 1$ column vector, the MMSE estimation of the transmitted signal, with $N_t$ being the number of transmitters; Y is an $N_r \times 1$ column vector, the received signal, with $N_r$ being the number of receiver antennas; H is an $N_r \times N_t$ matrix, the channel estimation matrix; and $R_{uu}$ is an $N_r \times N_r$ matrix, the noise covariance matrix. $(\ )^H$ denotes the Hermitian transpose.

The MIMO detection HAC is to obtain the transmitted signal X from the channel estimation matrix H, the inverse of the noise covariance matrix, $R_{uu}^{-1}$, and the received signal Y. The calculation steps are given in FIG. 10, where QR decomposition is to convert $T_3 = QR$, where Q is an orthogonal matrix ($Q^T Q = I$), and R is the upper triangular matrix. The mantissa bits for each block can be determined by following the design flow given in FIG. 9 described herein above.

In certain embodiments, a resulting implementation with floating point arithmetic described above may provide approximately 25% reduction in gate count as compared with the conventional fixed point arithmetic based design.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of non-volatile medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of digital baseband signal processing in a communication device, the method comprising:
   performing a multiple antenna detection portion of a baseband signal processing process using a first floating point processing unit;
   performing all other portions of the baseband signal processing process using a half-precision floating point processing unit;
   wherein the first floating point processing unit has a bit width that is larger than the bit width of the half-precision floating point processing unit; and
   wherein the first floating point processing unit comprises the half-precision floating point processing unit and one or more other half-precision floating point processing units.

2. The method in accordance with claim 1, wherein the multiple antenna detection portion comprises a matrix element calculation and a matrix inversion of a receiver baseband signal processing process.

3. The method in accordance with claim 1, further comprising
   performing an equalizer coefficient calculation of the baseband signal processing process using the first floating point processing unit,
   wherein the baseband signal processing process comprises an adaptive multi-user channels on one slot (VAMOS) protocol.

4. The method in accordance with claim 1, wherein the first floating point processing unit comprises a 28 bit floating point processing unit.

5. The method in accordance with claim 1, further comprising applying a scaling factor of $2^n$ when an overflow of the baseband signal processing process is detected, wherein n is a positive or negative integer.

6. The method in accordance with claim 1, further comprising when the baseband processing performed by the half-precision floating point processing unit comprises an accumulation operation comprising greater than a specified quantity of operands, performing the accumulation operation separately for each of one or more groups of operands equal to or less than the specified quantity.

7. The method in accordance with claim 6, wherein the quantity of operands comprises 64 operands.

8. The method in accordance with claim 1, wherein a first operand of a baseband processing signal processed by the first floating point processing unit comprises 1 sign bit, 7 exponent bits, and 20 mantissa bits, and a second operand of the baseband processing signal processed by the half-precision floating point processing unit comprises 1 sign bit, 5 exponent bits, and 10 mantissa bits.

9. The method in accordance with claim 8, further comprising:
   determining a link performance evaluation; and
   modifying a quantity of the mantissa bits performed by the first floating point processing unit or the half-precision floating point processing unit according to the determined link performance evaluation.

10. An apparatus comprising:
    a digital signal processor configured to:
       perform a multiple antenna detection portion of a baseband signal processing process using a first floating point processing unit, and
       perform all other portions of the baseband signal processing process using a half-precision floating point processing unit;
    wherein the first floating point processing unit has a bit width that is larger than the bit width of the half-precision floating point processing unit; and
    wherein the first floating point processing unit comprises the half-precision floating point processing unit and one or more other half-precision floating point processing units.

11. The apparatus in accordance with claim 10, wherein the multiple antenna detection portion comprises a matrix element calculation and a matrix inversion of a receiver baseband signal processing process.

12. The apparatus in accordance with claim 10, wherein the digital signal process is further configured to perform an equalizer coefficient portion of the baseband signal processing process using the first floating point processing unit,
    wherein the baseband signal processing process comprises an adaptive multi-user channels on one slot (VAMOS) protocol.

13. The apparatus in accordance with claim 10, wherein the first floating point processing unit comprises a 28 bit floating point processing unit.

14. The apparatus in accordance with claim 10, wherein the digital signal process is further configured to apply a scaling factor of $2^n$ when an overflow of the baseband signal processing process is detected, wherein n is a positive or negative integer.

15. The apparatus in accordance with claim 10, further comprising an application specific integrated circuit (ASIC) configured to:
    when the baseband processing performed by the half-precision floating point processing unit comprises an accumulation operation comprising greater than a specified quantity of operands, performing the accumulation operation separately for each of one or more groups of operands equal to or less than the specified quantity.

16. The apparatus in accordance with claim 15, wherein the quantity of operands comprises 64 operands.

17. The apparatus in accordance with claim 10, wherein a first operand of a baseband processing signal processed by the first floating point processing unit comprises 1 sign bit, 7 exponent bits, and 20 mantissa bits, and a second operand of the baseband processing signal processed by the half-precision floating point processing unit comprises 1 sign bit, 5 exponent bits, and 10 mantissa bits.

18. The apparatus in accordance with claim 17, further comprising an application specific integrated circuit (ASIC) configured to:
    determine a link performance evaluation; and
    modify a quantity of the mantissa bits performed by the first floating point processing unit or the half-precision floating point processing unit according to the determined link performance evaluation.

19. A communication device comprising:
a digital signal processor configured to:
perform a multiple antenna detection portion of a baseband signal processing process using a first floating point processing unit, and
perform all other portions of the baseband signal processing process using a half-precision floating point processing unit;
wherein the first floating point processing unit has a bit width that is larger than the bit width of the half-precision floating point processing unit; and
wherein the first floating point processing unit comprises the half-precision floating point processing unit and one or more other half-precision floating point processing units.

20. The communication device in accordance with claim 19, wherein the communication device comprises a base station.

21. The communication device in accordance with claim 19, wherein the communication device comprises a mobile station.

22. A method of digital baseband signal processing in a communication device, the method comprising:
performing a multiple antenna detection portion of a baseband signal processing process using a first floating point processing unit;
performing all other portions of the baseband signal processing process using a half-precision floating point processing unit;
wherein the first floating point processing unit has a bit width that is larger than the bit width of the half-precision floating point processing unit; and
wherein the multiple antenna detection portion comprises a matrix element calculation and a matrix inversion of a receiver baseband signal processing process.

23. A method of digital baseband signal processing in a communication device, the method comprising:
performing a multiple antenna detection portion of a baseband signal processing process using a first floating point processing unit;
performing all other portions of the baseband signal processing process using a half-precision floating point processing unit;
performing an equalizer coefficient calculation of the baseband signal processing process using the first floating point processing unit;
wherein the first floating point processing unit has a bit width that is larger than the bit width of the half-precision floating point processing unit; and
wherein the baseband signal processing process comprises an adaptive multi-user channels on one slot (VAMOS) protocol.

24. A method of digital baseband signal processing in a communication device, the method comprising:
performing a multiple antenna detection portion of a baseband signal processing process using a first floating point processing unit;
performing all other portions of the baseband signal processing process using a half-precision floating point processing unit;
when the baseband processing performed by the half-precision floating point processing unit comprises an accumulation operation comprising greater than a specified quantity of operands, performing the accumulation operation separately for each of one or more groups of operands equal to or less than the specified quantity; and
wherein the first floating point processing unit has a bit width that is larger than the bit width of the half-precision floating point processing unit.

25. A method of digital baseband signal processing in a communication device, the method comprising:
performing a multiple antenna detection portion of a baseband signal processing process using a first floating point processing unit;
performing all other portions of the baseband signal processing process using a half-precision floating point processing unit;
determining a link performance evaluation;
wherein the first floating point processing unit has a bit width that is larger than the bit width of the half-precision floating point processing unit;
wherein a first operand of a baseband processing signal processed by the first floating point processing unit comprises 1 sign bit, 7 exponent bits, and 20 mantissa bits, and a second operand of the baseband processing signal processed by the half-precision floating point processing unit comprises 1 sign bit, 5 exponent bits, and 10 mantissa bits; and
modifying a quantity of the mantissa bits performed by the first floating point processing unit or the half-precision floating point processing unit according to the determined link performance evaluation.

26. An apparatus comprising:
a digital signal processor configured to:
perform a multiple antenna detection portion of a baseband signal processing process using a first floating point processing unit, and
perform all other portions of the baseband signal processing process using a half-precision floating point processing unit;
wherein the first floating point processing unit has a bit width that is larger than the bit width of the half-precision floating point processing unit; and
wherein the multiple antenna detection portion comprises a matrix element calculation and a matrix inversion of a receiver baseband signal processing process.

27. An apparatus comprising:
a digital signal processor configured to:
perform a multiple antenna detection portion of a baseband signal processing process using a first floating point processing unit, and
perform all other portions of the baseband signal processing process using a half-precision floating point processing unit;
an application specific integrated circuit (ASIC) configured to:
when the baseband processing performed by the half-precision floating point processing unit comprises an accumulation operation comprising greater than a specified quantity of operands, perform the accumulation operation separately for each of one or more groups of operands equal to or less than the specified quantity; and
wherein the first floating point processing unit has a bit width that is larger than the bit width of the half-precision floating point processing unit.

28. An apparatus comprising:
a digital signal processor (DSP) configured to:
perform a multiple antenna detection portion of a baseband signal processing process using a first floating point processing unit, perform all other portions of the baseband signal processing process using a half-precision floating point processing unit, and determine a link performance evaluation;

wherein the first floating point processing unit has a bit width that is larger than the bit width of the half-precision floating point processing unit;

wherein a first operand of a baseband processing signal processed by the first floating point processing unit comprises 1 sign bit, 7 exponent bits, and 20 mantissa bits, and a second operand of the baseband processing signal processed by the half-precision floating point processing unit comprises 1 sign bit, 5 exponent bits, and 10 mantissa bits; and wherein the DSP is further configured to:

modify a quantity of the mantissa bits performed by the first floating point processing unit or the half-precision floating point processing unit according to the determined link performance evaluation.

* * * * *